(12) United States Patent
Diaz et al.

(10) Patent No.: US 9,267,393 B2
(45) Date of Patent: Feb. 23, 2016

(54) DRY ICE CLEANING APPARATUS FOR GAS TURBINE COMPRESSOR

(71) Applicant: General Electric Company, Schenectady, NY (US)

(72) Inventors: Pablo de Jesus Diaz, Greenville, SC (US); Rebecca Evelyn Hefner, Fountain Inn, SC (US)

(73) Assignee: General Electric Company, Schenectady, NY (US)

(*) Notice: Subject to any disclaimer, the term of this patent is extended or adjusted under 35 U.S.C. 154(b) by 206 days.

(21) Appl. No.: 13/783,831

(22) Filed: Mar. 4, 2013

(65) Prior Publication Data

US 2014/0245558 A1    Sep. 4, 2014

(51) Int. Cl.
*F01D 25/00* (2006.01)
*F01D 21/00* (2006.01)
*B24C 1/08* (2006.01)
*B24C 1/00* (2006.01)

(52) U.S. Cl.
CPC .............. *F01D 25/002* (2013.01); *B24C 1/003* (2013.01); *B24C 1/086* (2013.01); *F01D 21/003* (2013.01); *F05D 2230/72* (2013.01); *F05D 2260/607* (2013.01); *Y02T 50/675* (2013.01)

(58) Field of Classification Search
CPC ...... F02B 77/04; B08B 9/0321; F01D 25/002
USPC ................ 15/301, 320, 322, 406–408, 143.1, 15/144.1–144.5; 239/280, 280.5, 587.1, 239/587.2
See application file for complete search history.

(56) References Cited

U.S. PATENT DOCUMENTS

| | | | |
|---|---|---|---|
| 2,857,201 A * | 10/1958 | Palmer .......................... | 239/281 |
| 4,323,196 A * | 4/1982 | Logue et al. .................. | 239/532 |
| 6,585,569 B2 | 7/2003 | Tomlinson | |
| 6,685,115 B1 * | 2/2004 | Hardin ......................... | 239/587.1 |
| 6,883,527 B2 | 4/2005 | Travaly et al. | |
| 6,976,644 B2 * | 12/2005 | Troudt ......................... | 239/587.1 |
| 8,245,957 B2 * | 8/2012 | Zhang .......................... | 239/587.5 |
| 2005/0126597 A1* | 6/2005 | Hochstein et al. ............. | 134/22.1 |

* cited by examiner

*Primary Examiner* — Dung Van Nguyen
(74) *Attorney, Agent, or Firm* — Ernest G. Cusick; Hoffman Warnick LLC

(57) ABSTRACT

Aspects of the invention provide an apparatus for cleaning airfoils inside a gas turbine compressor. In one embodiment, an apparatus for cleaning at least one airfoil within a turbine compressor, includes: a hose for applying cleaning material to the at least one airfoil; and an articulation assembly for articulating a nozzle of the hose, the articulation assembly including: a main shaft attached to the hose at a first end; and an articulating trigger for rotating the first end of the main shaft. The apparatus may further include a borescope attached to the articulation assembly and a borescope monitor for viewing the at least one airfoil via the borescope.

10 Claims, 4 Drawing Sheets

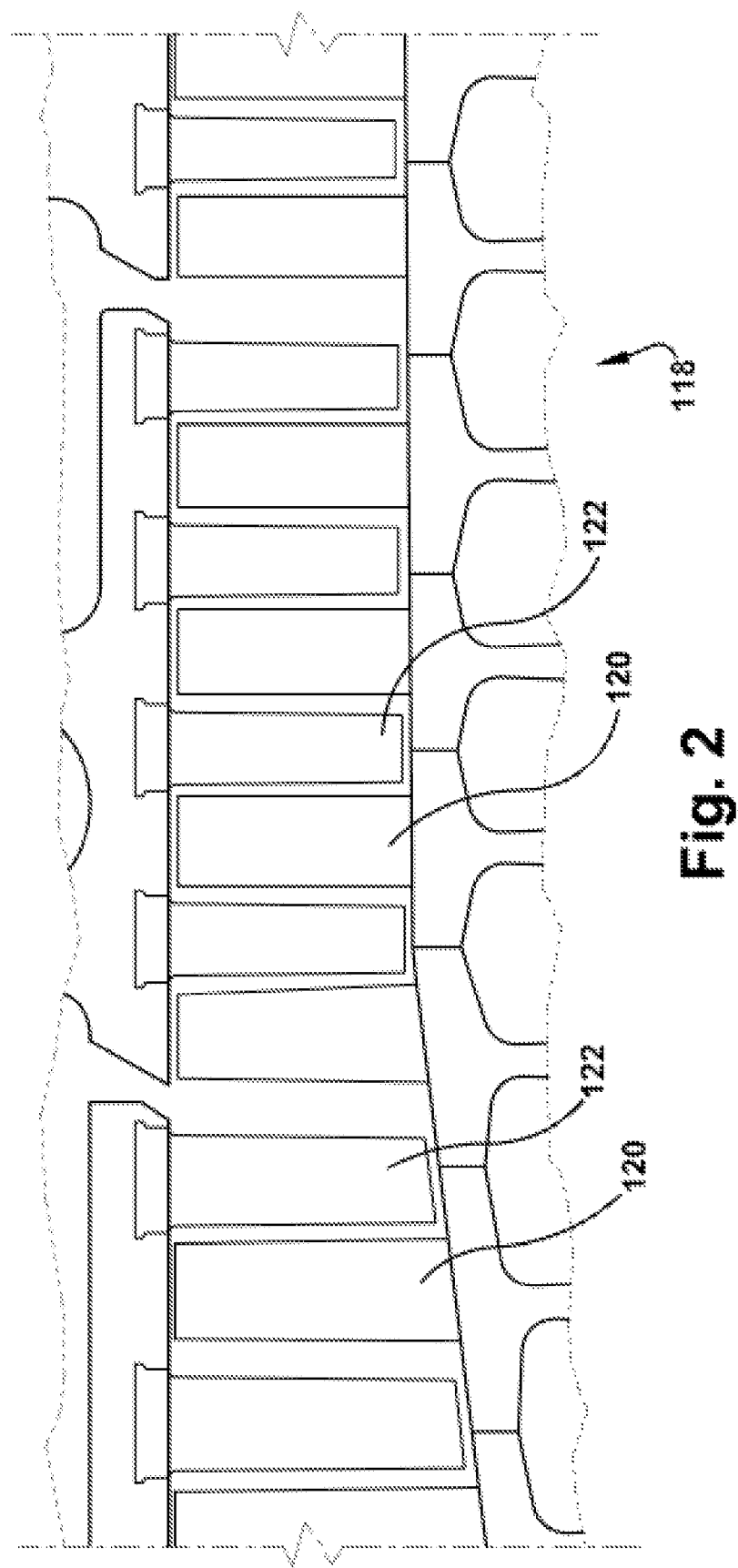

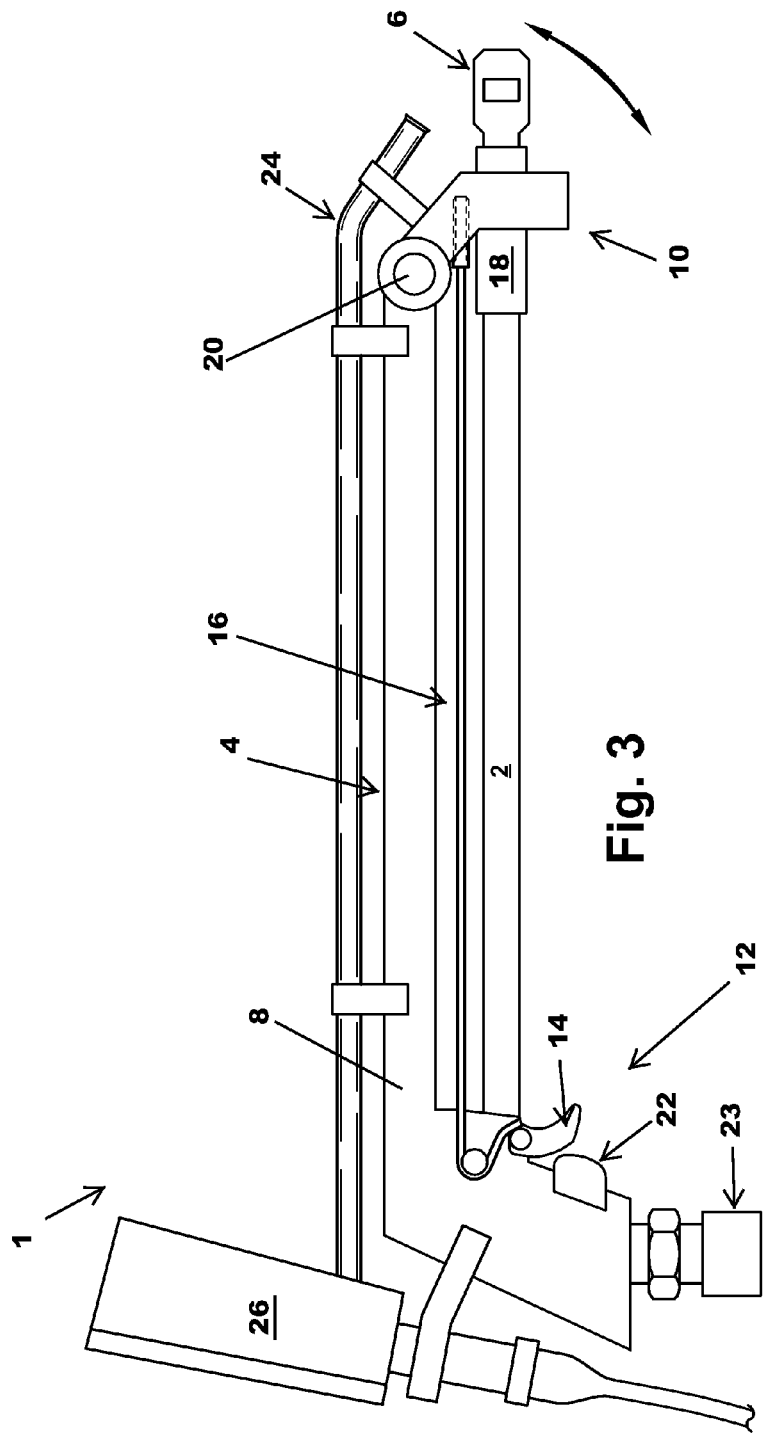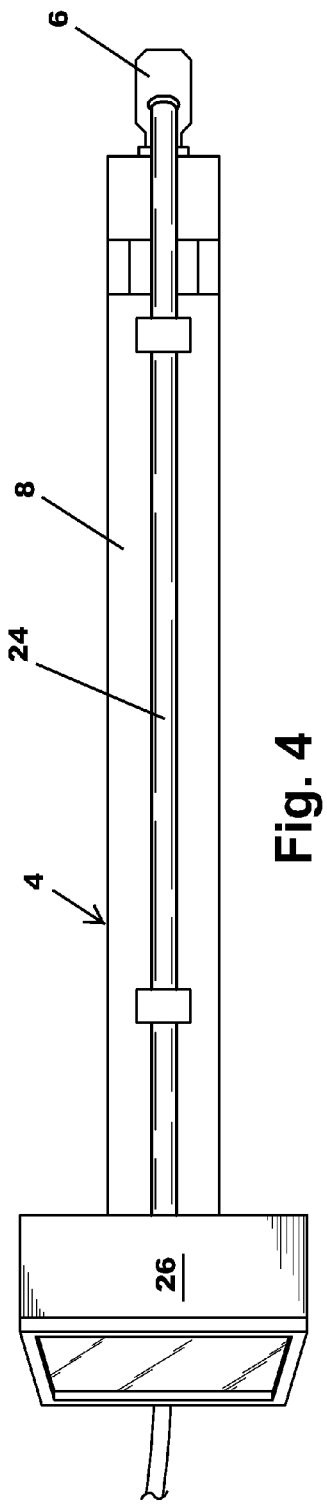

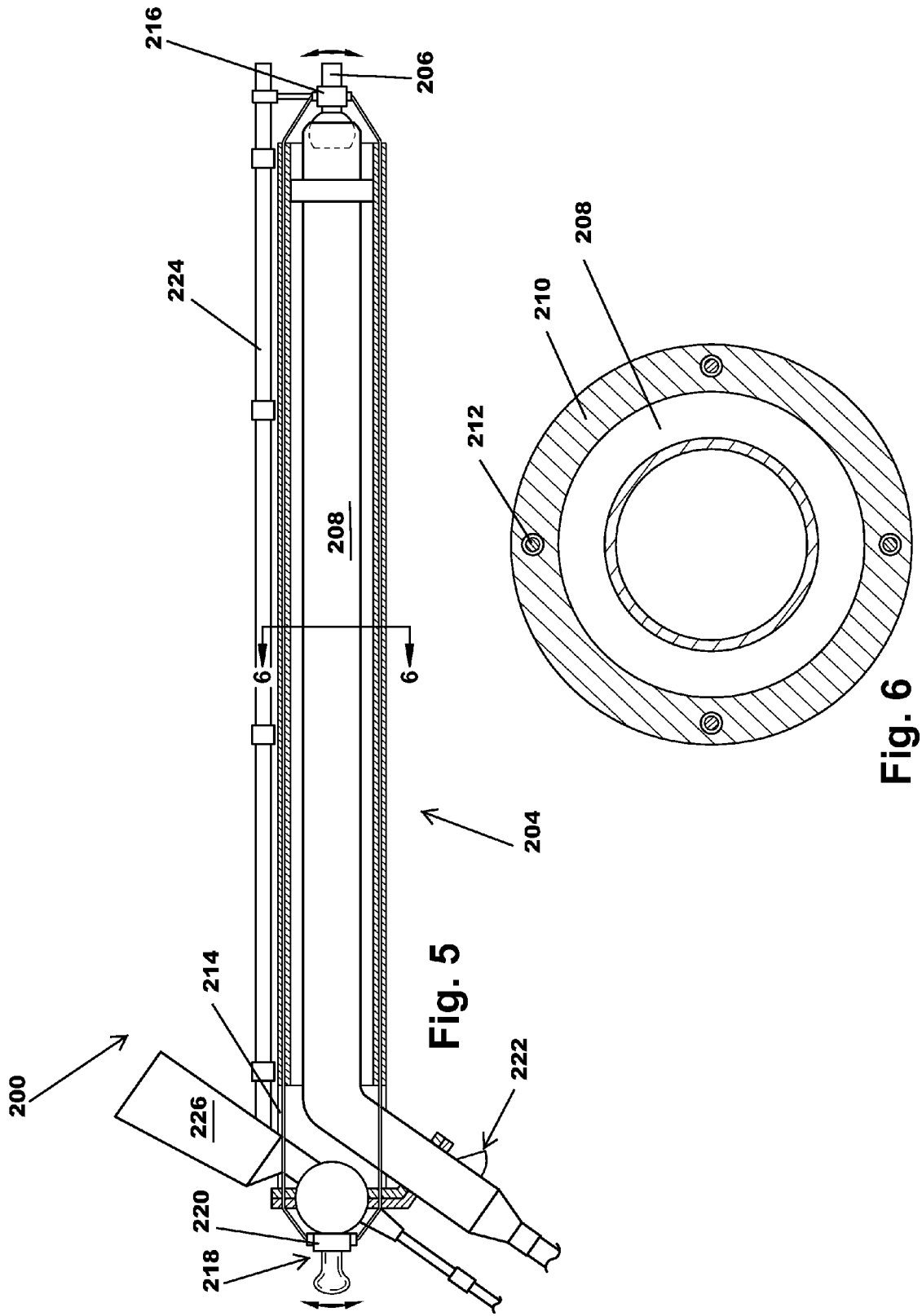

DRY ICE CLEANING APPARATUS FOR GAS TURBINE COMPRESSOR

TECHNICAL FIELD

The subject matter disclosed herein relates to turbines, and more particularly, to an apparatus for cleaning airfoils inside a gas turbine compressor.

BACKGROUND OF THE INVENTION

One of the factors that is analyzed in trying to increase gas turbine efficiency, performance, and reliability is compressor fouling. Compressor fouling is caused by contaminants, such as oil, particulates, and harmful chemicals, which are ingested in the turbine. These contaminants, if not properly removed, result in efficiency losses and cause corrosion. Corrosion is one of the leading causes of gas turbine failure.

Currently, gas turbine compressors are cleaned using a water wash process that injects water and detergent through an inlet of the gas turbine at low spinning speeds. This process only cleans forward compressor stages, due to the required water nozzle pressure. Further, this process only cleans the exposed side (suction side) of the blades (i.e., airfoils). Due to heavy deposits on the blades that were not removed from the water wash method, extensive field corrosion inspections could not reveal whether the airfoil surface was corroded, since the airfoil surfaces is not cleaned effectively from the water wash.

BRIEF DESCRIPTION OF THE INVENTION

Aspects of the invention provide an apparatus for cleaning airfoils inside a gas turbine compressor. In one embodiment, an apparatus for cleaning at least one airfoil within a turbine compressor, includes: a hose for applying cleaning material to the at least one airfoil; and an articulation assembly for articulating a nozzle of the hose, the articulation assembly including: a main shaft attached to the hose at a first end; and an articulating trigger for rotating the first end of the main shaft. The apparatus may further include a borescope attached to the articulation assembly and a borescope monitor for viewing the at least one airfoil via the borescope.

A first aspect of the disclosure provides an apparatus for cleaning at least one airfoil within a turbine compressor, comprising: a hose for applying cleaning material to the at least one airfoil; and an articulation assembly for articulating a nozzle of the hose, the articulation assembly comprising: a main shaft attached to the hose at a first end; and an articulating trigger for rotating the first end of the main shaft.

A second aspect of the disclosure provides an apparatus for cleaning at least one airfoil within a turbine compressor, comprising: a hose for applying cleaning material to the at least one airfoil; an articulation assembly for articulating a nozzle of the hose, the articulation assembly comprising: a main shaft attached to the hose at a first end; and an articulating trigger for rotating the first end of the main shaft; and a borescope attached to the articulation assembly for inspecting the at least one airfoil.

A third aspect of the disclosure provides an apparatus for cleaning at least one airfoil within a turbine compressor, comprising: a hose for applying cleaning material to the at least one airfoil; an articulation assembly for articulating a nozzle of the hose, the articulation assembly comprising: a sheath surrounding a portion of the hose, the sheath including a plurality of guide holes; a plurality of cables positioned within the guide holes and attached to the nozzle of the hose; and an actuator for controlling the plurality of cables to articulate the nozzle of the hose.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 2 shows a cross-sectional view of a conventional compressor.

FIG. 3 shows a side view of an apparatus for cleaning at least one airfoil according to embodiments of the invention.

FIG. 4 shows a side view of an apparatus for cleaning at least one airfoil according to embodiments of the invention.

FIG. 5 shows a cross-sectional view of an articulation assembly according to embodiments of the invention.

FIG. 6 shows a cross-sectional view of the articulation assembly of FIG. 5 along cut 6-6 according to embodiments of the invention.

Figure 1:
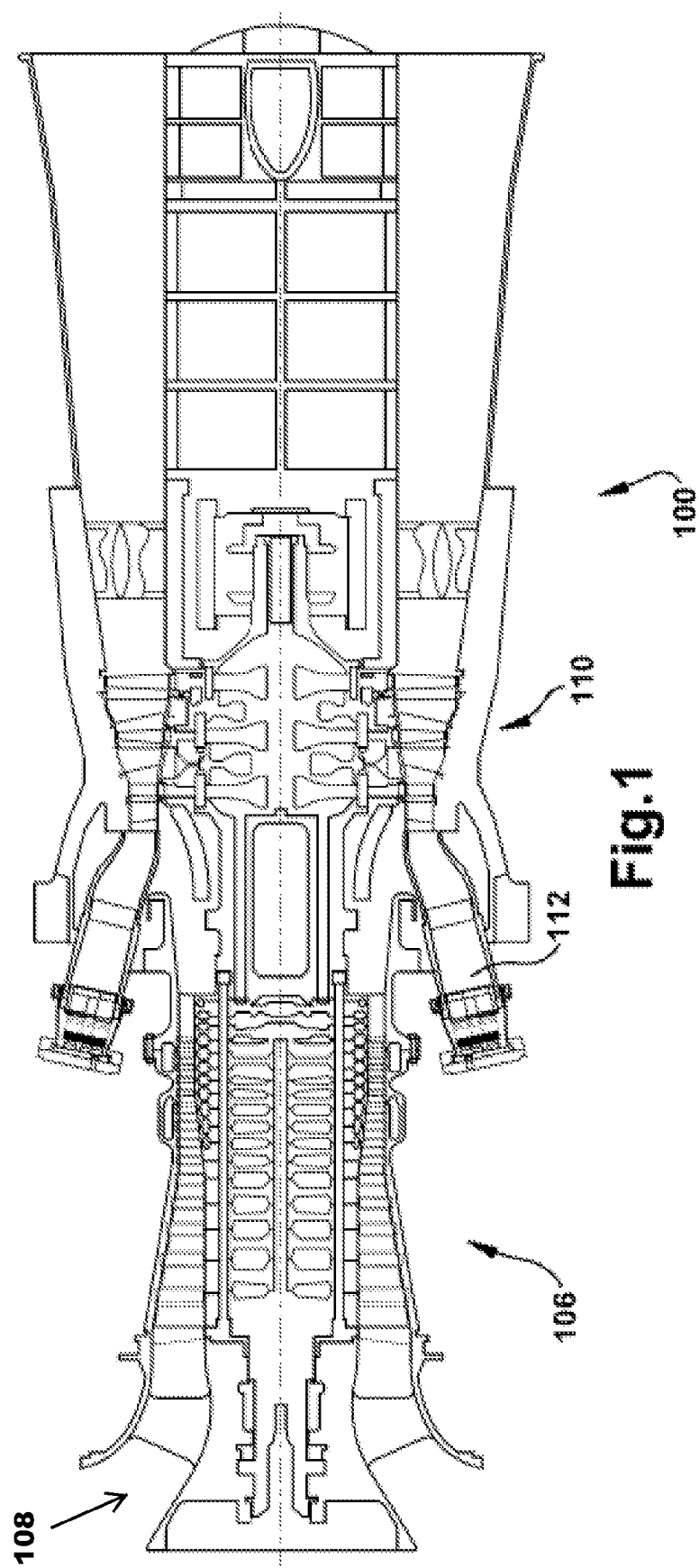
FIG. 1 shows a cross-sectional view of a conventional gas turbine.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated, the subject matter disclosed herein relates to turbines, and more particularly, to an apparatus for cleaning airfoils inside a gas turbine compressor.

One of the factors that is analyzed in trying to increase gas turbine efficiency, performance, and reliability is compressor fouling. Compressor fouling is caused by contaminants, such as oil, particulates, and harmful chemicals, which are ingested in the turbine. These contaminants, if not properly removed, result in efficiency losses and cause corrosion. Corrosion is one of the leading causes of gas turbine failure.

Currently, gas turbine compressors are cleaned using a water wash process that injects water and detergent through an inlet of the gas turbine at low spinning speeds. This process only cleans forward compressor stages, due to the required water nozzle pressure. Further, this process only cleans the exposed side (suction side) of the blades (i.e., airfoils). Due to heavy deposits on the blades that were not removed by the water wash method, extensive field corrosion inspections could not reveal whether the airfoil surface was corroded, since the airfoil surfaces are not cleaned effectively from by water wash.

Therefore, dry ice blast methods have been employed to clean airfoil surfaces. However, current dry ice blast methods use a blind pipe that is inserted into the inlet of the gas turbine compressor. Multiple operators are required in order to effectively use the dry ice blast method: a blasting operator, a bore scope operator, and a bore scope/blaster coordinator.

Referring now to the figures, FIG. 1 illustrates a cross-sectional view of a gas turbine engine 100, which will be used to describe an exemplary application of the present invention. It will be understood by those skilled in the art that the present invention is not limited to this type of usage. As stated, the present invention may be used in gas turbine engines, such as the engines used in power generation and airplanes, steam turbine engines, and other types of rotary engines and dynamoelectric machines. In general, gas turbine engines operate by extracting energy from a pressurized flow of hot gas that is produced by the combustion of a fuel in a stream of compressed air. As illustrated in FIG. 1, gas turbine engine 100 may be configured with an axial compressor 106 that is mechanically coupled by a common shaft or rotor to a downstream turbine section or turbine 110, and a combustor 112 positioned between the compressor 106 and the turbine 110.

FIG. 2 illustrates a cross-sectional view of an exemplary multi-staged axial compressor 118 that may be used in the gas turbine engine 100 of FIG. 1. As shown, the compressor 118 may include a plurality of stages. Each stage may include a row of compressor rotor blades 120 followed by a row of compressor stator blades 122. Thus, a first stage may include a row of compressor rotor blades 120, which rotate about a central shaft, followed by a row of compressor stator blades 122, which remain stationary during operation. The compressor stator blades 122 generally are circumferentially spaced one from the other and fixed about the axis of rotation. The compressor rotor blades 120 are circumferentially spaced and attached to the shaft; when the shaft rotates during operation, the compressor rotor blades 120 rotate about it. As one of ordinary skill in the art will appreciate, the compressor rotor blades 120 are configured such that, when spun about the shaft, they impart kinetic energy to the air or fluid flowing through the compressor 118. The compressor 118 may have other stages beyond the stages that are illustrated in FIG. 2. Additional stages may include a plurality of circumferential spaced compressor rotor blades 120 followed by a plurality of circumferentially spaced compressor stator blades 122.

Aspects of the invention provide an apparatus for cleaning airfoils inside a gas turbine compressor, such as the gas turbine compressor 106 shown in FIG. 1 or the compressor 118 shown in FIG. 2. The apparatus may be inserted into inlet 108, as seen in FIG. 1. In one embodiment, an apparatus for cleaning at least one airfoil within a turbine compressor, includes: a hose for applying cleaning material to the at least one airfoil; and an articulation assembly for articulating a nozzle of the hose, the articulation assembly including: a main shaft attached to the hose at a first end; and an articulating trigger for rotating the first end of the main shaft. The apparatus may further include a borescope attached to the articulation assembly and a borescope monitor for viewing the at least one airfoil via the borescope. In this way, an articulated nozzle is coupled with bore scope technology, so that only one operator is required to clean and inspect the airfoils.

Turning now to FIGS. 3 and 4, a side view and a top view, respectively, of an apparatus 1 for cleaning at least one airfoil (e.g., blades 120, 122 shown in FIG. 2) within a turbine compressor (e.g., compressor 106 in FIG. 1 or compressor 118 in FIG. 2) according to embodiments of the invention is shown. The apparatus 1 includes a hose 2 for applying a cleaning material to the at least one airfoil. For example, the hose 2 may provide dry ice. However, it is understood that the hose 2 may provide any cleaning material known to one in the art.

The apparatus 1 also includes an articulation assembly 4 for articulating a nozzle 6 of the hose 2. The articulation assembly 4 includes a main shaft 8 that is attached to the hose 2 at a first end 10 and a second end 12. The articulation assembly 4 also includes an articulating trigger 14 for rotating the first end 10 of the main shaft 8. The articulating trigger 14 is attached to an articulating cable 16 that is attached to the first end 10 of the main shaft 8.

In response to a force exerted (via an operator) on the articulating trigger 14, the articulating cable 16 exerts a force on the first end 10 of the main shaft 8 and rotates the first end 10. A flexible tubing 18 attaches the nozzle 6 to the hose 2, and the first end 10 of the main shaft 8 is attached to the flexible tubing 18. As such, the nozzle 6 is able to move, in response to the first end 10 of the main shaft 8 flexing the flexible tubing 18. When nozzle 6 moves, the first end 10 of the main shaft 8 rotates about a rotating feature 20. Rotating feature 20 may be a spring that attaches first end 10 of main shaft 8 to a central portion of main shaft 8.

Once the nozzle 6 is in a desired position, as to be determined by an operator, the cleaning material (e.g., dry ice) is provided to the at least one airfoil via cleaning material trigger 22. A high pressure fitting 23 is provided to attach to another hose that provides the cleaning material.

The apparatus 1 may also include a borescope 24 for inspecting and viewing the at least one airfoil prior to, during, and/or after cleaning material is provided. The borescope 24 is attached to the apparatus 1. In the embodiment shown in FIG. 4, the borescope 24 is attached to the main shaft 8 of the articulation assembly 4. A borescope monitor 26 is provided and attached to the borescope 24 and the apparatus 1, so that an operator may view the at least one airfoil via the borescope 24.

Turning now to FIG. 5, a side view of an apparatus 200 for cleaning at least one airfoil (e.g., blades 120, 122 in FIG. 2) within a turbine compressor (e.g., compressor 106 in FIG. 1 or compressor 118 in FIG. 2) according to embodiments of the invention is shown. FIG. 6 shows a cross-sectional view of articulation assembly along cut 6-6 shown in FIG. 5. In this embodiment, the apparatus 200 includes a hose 208 for applying the cleaning material to the at least one airfoil. The apparatus 200 also includes an articulation assembly 204 for articulating a nozzle 206 of the hose 208.

The articulation assembly 204 includes a sheath 210 for surrounding a portion of the hose 208. That is, as shown in FIG. 5, the sheath 210 does not surround the nozzle 206. The sheath 210 includes a plurality of guide holes 212. As shown in FIG. 6, sheath 210 includes four guide holes 212. However, it is understood that sheath 210 may include any number of guide holes 212. A plurality of cables 214 are positioned within the guide holes 212 and attached to nozzle 206. That is, each of the cables 214 is attached to a flexible portion 216 of nozzle 206. Although FIG. 5 only shows two cables 214, it is understood that more cables may exist. For example, articulation assembly 204 may include 2 additional cables 214 that are not shown in FIG. 5. Articulation assembly 204 also includes an actuator 218 for controlling the plurality of cables 214 in order to articulate the nozzle 206 of hose 208. A cable mounting collar 220 may be provided to connect the plurality of cables 214 to the actuator 218. Actuator 218 may include any now known or later developed actuating mechanism, such as, but not limited to a joystick (as shown). Once nozzle 206 is in the correct position for cleaning, trigger 222 may be utilized by an operator to provide the cleaning material (e.g., dry ice) to the at least one airfoil.

The articulation assembly 204 may include the borescope 224 and borescope monitor 226 (similar to borescope 24 and borescope monitor 26 shown in FIG. 3) for viewing the at least one airfoil during cleaning and for viewing defects in the airfoils. In this way, only one operator is required for both cleaning and inspecting the at least one airfoil.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for cleaning at least one airfoil within a turbine compressor, comprising:
    a hose for applying cleaning material to the at least one airfoil;
    an articulation assembly for articulating a nozzle of the hose, the articulation assembly comprising:
        a main shaft attached to the hose at a first end; and
        an articulating trigger for rotating the first end of the main shaft; and
        a spring, wherein the first end of the main shaft rotates about the spring; and
    a flexible tubing that attaches the nozzle to the hose, wherein the first end of the main shaft is attached to the flexible tubing.

2. The apparatus of claim 1, further comprising an articulating cable attached to the first end of the main shaft, wherein the articulating cable rotates the first end of the main shaft, in response a force on the articulating trigger.

3. The apparatus of claim 1, further comprising a cleaning material trigger for providing the cleaning material to the nozzle of the hose.

4. The apparatus of claim 1, further comprising a borescope attached to the main shaft of the articulation assembly.

5. The apparatus of claim 4, further comprising a borescope monitor for viewing the at least one airfoil via the borescope.

6. The apparatus of claim 1, wherein the cleaning material includes dry ice.

7. An apparatus for cleaning at least one airfoil within a turbine compressor, comprising:
    a hose for applying cleaning material to the at least one airfoil;
    an articulation assembly for articulating a nozzle of the hose, the articulation assembly comprising:
        a main shaft attached to the hose at a first end;
        an articulating trigger for rotating the first end of the main shaft; and
        a spring, wherein the first end of the main shaft rotates about the spring;
    a borescope attached to the articulation assembly for inspecting the at least one airfoil; and
    a flexible tubing that attaches the nozzle to the hose, wherein the first end of the main shaft is attached to the flexible tubing.

8. The apparatus of claim 7, further comprising an articulating cable attached to the first end of the main shaft, wherein the articulating cable rotates the first end of the main shaft, in response a force on the articulating trigger.

9. The apparatus of claim 7, further comprising a cleaning material trigger for providing the cleaning material to the nozzle of the hose.

10. The apparatus of claim 7, further comprising a borescope monitor for viewing the at least one airfoil via the borescope.

* * * * *